United States Patent [19]

Swartz

[11] 3,882,068

[45] May 6, 1975

[54] SIZING COMPOSITION FOR GLASS FIBERS OF POLYPROPYLENE EMULSION AND SILANE COUPLING AGENT

[75] Inventor: Paul Russel Swartz, Perrysburg, Ohio

[73] Assignee: Johns-Manville Corporation, Denver, Colo.

[22] Filed: Dec. 1, 1972

[21] Appl. No.: 311,065

[52] U.S. Cl. .......................... 260/29.6; 260.6 H, 260/29.6 MN; 260/29.6 MP; 260/42.15; 260/42.18
[51] Int. Cl. ............................................ C08f 45/24
[58] Field of Search ............................ 260/29.6 XA

[56] References Cited
UNITED STATES PATENTS

| | | | |
|---|---|---|---|
| 3,644,141 | 2/1972 | Preston | 260/29.6 XA |
| 3,814,715 | 6/1974 | Nalley et al. | 260/29.6 XA |

*Primary Examiner*—Harold D. Anderson
*Attorney, Agent, or Firm*—Robert M. Krone; James W. McClain

[57] ABSTRACT

A sizing composition for glass fibers that is adapted to reinforced thermoplastic resin systems comprises 2–30 percent by weight polyolefin emulsion having a solids content of about 30 percent, 0.01 to 2.5 percent by weight coupling agent, and a balance of water.

1 Claim, No Drawings

SIZING COMPOSITION FOR GLASS FIBERS OF POLYPROPYLENE EMULSION AND SILANE COUPLING AGENT

BACKGROUND OF THE INVENTION

This invention relates to sizing compositions designed for glass fibers. In particular, the invention relates to sizing compositions for glass rovings or chopped glass strands that are used to reinforce thermoplastic resin systems, e.g., polyolefins.

Glass fibers are produced by the rapid attenuation of hundreds of filaments of molten glass issuing from orifices of a bushing. The filaments are gathered together into a glass strand at an applicator which applies a sizing composition to the glass strand. Then the glass strand is wound about a rapidly rotating drum to form a package.

Glass filaments which are to reinforce plastics must be coated with a sizing to facilitate their handling and to promote adhesion at the glass resin interface of a plastic composite. If a size is not applied to the glass filaments, abrasion between the filaments during handling causes fracture of the filaments. In addition, the glass surface, without a size, does not provide a satisfactory bond with a resin system. A size, therefore, is designed to improve the resistance of the glass filaments to abrasion and to improve the bonding between the glass filaments and the resin. In addition to the above, if the incorporation of glass filaments in certain resinous materials is to be satisfactory, the color of the end composite must be acceptable.

Many sizing compositions have been tested on glass filaments intended to reinforce polyolefins However, none have proved satisfactory for the purpose of reinforcing polyolefins. The sized glass did not reinforce the glass resin composite to the desired degree and/or the color of the glass reinforced composite was not acceptable. While polyvinyl acetate sizing compositions have been used on glass filaments intended to reinforce polyolefins and the color of the glass reinforced composite has been acceptable, these components lack the physical properties that such a composite should possess. Glass filaments, when sized with a typical polyvinyl acetate size utilizing a silane coupling agent and when injection molded into ASTM specimens with a general purpose polypropylene resinous dry blend of 30 percent chopped strand and 70 percent resin by weight, will give the following typical results:

|  |  | ASTM Test No. |
|---|---|---|
| Tensile | 7,800 psi | D 638-68 |
| Flexural | 10,000 psi | D 790-70 |
| Heat Distortion 242° F. | 264 psi | D 648-56 |

SUMMARY OF THE INVENTION

It is an object of the present invention to provide a sizing composition having excellent film clarity, very good abrasion resistance, and high tensile strength. It is a further object of the invention to provide a sizing which provides an excellent means of bonding glass to a resin.

The sizing composition of the present invention comprises 2–30 percent by weight polyolefin emulsion having a solids content of about 30 percent and water content of about 70 percent, 0.01 to 2.5 percent by weight coupling agent and a balance of water. Polyolefin emulsions having a high polypropylene content give the best results. In addition to the above ingredients, the composition may contain anywhere from a trace to 3 percent lubricant and a trace to 2.5 percent by weight various additives.

DESCRIPTION OF THE PREFERRED EMBODIMENT

A sizing composition can be broken down into five basic ingredients. The ingredients are: (1) film former, (2) lubricant, (3) coupling agent, (4) additives, and (5) carrier. The sizing composition of the present invention comprises a polyolefin emulsion, silane coupling agent or agents and a carrier. In addition to the above, conventional lubricants and additives can also be employed in the sizing composition.

The film former utilized in the sizing composition of the present invention is a polyolefin emulsion and preferably a polypropylene emulsion. Several polypropylene emulsions are commercially available such as Jersey State DLS-713 marketed by Sybron Corporation which has a solids content of 32 percent plus or minus 2 percent and ABRAZE-ADE marketed by Proctor Chemical Corporation and having a solids content of 30 percent plus or minus 2 percent. Such materials may not be true polypropylene emulsions but the prolypropylene polymer may have been modified to some degree in order to form the emulsion. In many cases, these emulsions are said to contain carboxylated polypropylene. Thus, for the purposes of this invention, the term polypropylene emulsion shall include both polypropylene emulsions and carboxylated polypropylene emulsions.

While polypropylene emulsions are readily bonded to thermoplastic resins such as polyolefin resins, these emulsions lack the ability to bond to a glass surface. Consequently, a coupling agent is required to help effect the bond between the inorganic surface of the glass and the organic film formed by the polypropylene emulsion. The coupling agents used in the composition of the present invention are silane coupling agents that are characterized by their ability to hydrolyze and bond to glass. The nature of the organic reactive end of the silane must be such that it is compatible and functional with the matrix resin. The coupling agent can be a single compound or a mixture of two or more silane compounds. For the purposes of this invention the term silane coupling agent means a class of silane coupling agents having the properties of the following family of silane coupling agents:

Vinyl-tris (2 methoxyethoxy) silane
beta - (3, 4 - Epoxycyclohexyl) ethyltrimethoxy silane
gamma - Glycidoxy - propyltrimethoxy silane
gamma - Aminopropyltriethoxy silane
N - beta - (Aminoethyl) - gamma - amino - propyltrimethoxy silane
gamma - Methacryloxy propyltrimethoxy silane
N - (3 - triethoxysilyl propyl) maleamic acid In the sizing composition of this invention, the polypropylene emulsion acts as both the film former and a lubricant. While an additional lubricant is not generally needed, it is possible to add another lubricant without altering the effectiveness of the present sizing composition. The lubricant, of course, is utilized to provide lubricity and thereby avoid fracture of the filaments at contact points between the filaments. Suitable ingredients for this purpose include:
1. polyoxyethylene fatty esters
2. Cationic active acid solubilized fatty acid amides
3. Polyethylene and polypropylene glycols
4. Polyolefin emulsions
5. Polyalkylene glycols Lubricants of the type normally employed in the treatment of glass fibers are well known in the art. The above list is merely illustrative and is in no way intended to include all of the lubricants which can be added to the composition. The lubricant, if used, is generally present in amounts ranging from a trace or 0.05% to 3 percent by weight.

Certain additives can also be added to the sizing composition to lend additional properties to the sizing composition. These additives can function as antistats, film former modifiers, wetting agents, stabilizers, etc., and are well known in the art.

In addition to the above, a sizing composition includes a carrier which is deionized water.

The table below gives both the general and preferred ranges (in percentage by weight) of the components of the sizing composition of the present invention. The lubricant if present can be present in amounts ranging from a trace to 3 percent by weight of the composition. The additive, if present, can be present in amounts ranging from a trace to 2.5 percent of the composition.

|   |                    | General Range | Preferred    |
|---|--------------------|---------------|--------------|
| 1.| Polyolefin emulsion| 2 – 30%       | 10 – 18%     |
| 2.| Coupling agent (s) | 0.01 – 2.5%   | 0.3 – 0.7%   |
| 3.| Lubricant          | 0.0 – 3.0%    | 0.0 – 3.0%   |
| 4.| Additive           | 0.0 – 2.5%    | 0.0 – 2.5%   |

This invention is best illustrated by the following examples. By comparing the mechanical reinforcement properties given in these examples to those given for a polyvinyl acetate-silane treated glass, it is clear that the fiber glass sizes of this invention give improved reinforcement to glass filled polypropylene resins. The reinforcement properties given are from dry blends of 30 percent by weight glass and 70 percent by weight polypropylene resin injection molded into ASTM specimens. The ASTM test methods used are:

Tensile - ASTM Test No. D638-68
Flexural - ASTM Test No. D790-70
Heat Distortion Temp. - ASTM Test No. D648-56

These examples are presented purely for illustrative purposes and it is not intended that the scope of the invention or the manner in which it may be practiced be limited in any way by these examples.

EXAMPLE 1

| Polypropylene emulsion | 9.00% |
|---|---|
| Gamma - Aminopropyltriethoxy silane | .25% |
| Ammonium Orthophosphate, Di Basic | .25% |
| Deionized Water | 90.50% |

Place one-half the required amount of water in the mix tank and start the agitation. Add the polypropylene emulsion to the mix tank. Hydrolyze the silane in water and add to the mix tank. Dissolve the ammonium orthophosphate and add to the mix tank. Add the remainder of the water and adjust the pH to 7.0 with acetic acid and/or ammonium hydroxide.

The reinforcement properties using 30 percent by weight of glass coated with the above size and 70 percent by weight polypropylene resin molded into ASTM parts are:

| Tensile | 10,090 psi |
|---|---|
| Flexural | 13,200 psi |
| Heat Distortion at 264 psi | 300 Degrees F. |

EXAMPLE 2

| Polypropylene emulsion | 18.00% |
|---|---|
| Gamma - Glycidoxypropyltrimethoxy silane | .30% |
| Deionized water | 81.70% |

Use same mix procedure as in Example 1. The reinforcement properties obtained with the size of this example using 30 percent glass fibers and 70 percent polypropylene resin, by weight, injection molded into ASTM specimens are:

| Tensile | 7,970 psi |
|---|---|
| Flexural | 10,450 psi |
| Heat Distortion at 204 psi | 246 Degrees F. |

EXAMPLE 3

| Polypropylene Emulsion | 15.00% |
|---|---|
| N - (3 - triethoxysilyl propyl) maleamic acid | .25% |
| Gamma - Aminopropyltriethoxy silane | .25% |
| Deionized water | 84.50% |

Use same mix procedure as in Example 1. The reinforcement properties using 30 percent by weight chopped strand and 70 percent by weight polypropylene resin dry blended and injection molded into ASTM specimens are:

| Tensile | 9,330 psi |
|---|---|
| Flexural | 12,000 psi |
| Heat Distortion at 264 psi | 280 Degrees F. |

EXAMPLE 4

| Polypropylene Emulsion | 12.00% |
|---|---|
| Gamma - Aminopropyltriethoxy silane | .20% |
| Gamma - Glycidoxypropyltrimethoxy silane | .20% |
| Ammonium Orthophosphate, Di Basic | .25% |
| Polyethylene Glycol | .50% |
| Deionized Water | 86.85% |

Use same mix procedure as Example 1, whereas, each ingredient is dispersed in water before adding to the main mix. The reinforcement using 30 percent of glass fibers coated with this size and 70 percent by weight, polypropylene resin, dry blended and molded into ASTM parts are:

| | | |
|---|---|---|
| Tensile | 9,260 | psi |
| Flexural | 12,200 | psi |
| Heat Distortion at 264 psi | 294 | Degrees F. |

EXAMPLE 5

Same as example 4 except the two silanes and the ammonium orthophosphate salt were at 0.30 percent and the polyethylene glycol was not used. The injection molded ASTM parts of dry blends of 30 percent glass fibers and 70 percent polypropylene resin by weight had the following properties:

| | | |
|---|---|---|
| Tensile | 8,640 | psi |
| Flexural | 11,800 | psi |
| Heat Distortion at 264 psi | 297 | Degrees F. |

EXAMPLE 6

| | |
|---|---|
| Polypropylene emulsion | 12.00% |
| Vinyl - Tris (2 - methoxyethoxy) silane | .30% |
| Gamma - Aminopropyltriethoxy silane | .30% |
| Ammonium Orthophosphate Mono Basic | .30% |
| Deionized water | 87.10% |

Use same mix procedure as Example 1. The reinforcement properties using glass coated with this size at 30 percent by weight and a polypropylene resin at 70 percent by weight injection molded dry blends into ASTM specimens are:

| | | |
|---|---|---|
| Tensile | 8,840 | psi |
| Flexural | 12,180 | psi |
| Heat Distortion at 264 psi | 294 | Degrees F. |

What is claimed is:

1. A sizing composition for glass fibers used for reinforcing thermoplastic resin systems which consists of, in weight percent based on the composition:
2 to 30 percent polypropylene emulsion film former having a solids content of about 30 percent;
0.01 to 2.5 percent silane coupling agent; and the balance being water.

* * * * *